"" "" ""

United States Patent
Conard et al.

(10) Patent No.: US 9,948,838 B2
(45) Date of Patent: Apr. 17, 2018

(54) ARTICULATED DESKTOP MAGNIFIER

(71) Applicant: Freedom Scientific, Inc., St. Petersburg, FL (US)

(72) Inventors: Todd Conard, Ruskin, FL (US); Breanna Stachowski, Philadelphia, PA (US); Seth Galewyrick, Victor, MT (US)

(73) Assignee: Freedom Scientific, Inc., St. Petersburg, FL (US)

( * ) Notice: Subject to any disclaimer, the term of this patent is extended or adjusted under 35 U.S.C. 154(b) by 383 days.

(21) Appl. No.: 14/628,032

(22) Filed: Feb. 20, 2015

(65) Prior Publication Data

US 2016/0248948 A1     Aug. 25, 2016

(51) Int. Cl.
*H04N 5/225*     (2006.01)
*H04N 5/232*     (2006.01)
*G02B 27/04*     (2006.01)
*G02B 7/02*      (2006.01)
*G02B 27/02*     (2006.01)

(52) U.S. Cl.
CPC .......... *H04N 5/2253* (2013.01); *G02B 7/023* (2013.01); *G02B 27/027* (2013.01); *G02B 27/04* (2013.01); *H04N 5/2252* (2013.01); *H04N 5/2257* (2013.01); *H04N 5/23203* (2013.01)

(58) Field of Classification Search
None
See application file for complete search history.

(56) References Cited

U.S. PATENT DOCUMENTS

| 5,317,354 | A  | * | 5/1994  | Kosako   | G03B 17/38 |
|           |    |   |         |          | 396/267    |
| 5,323,203 | A  | * | 6/1994  | Maruyama | G03B 17/38 |
|           |    |   |         |          | 340/12.17  |
| 5,823,651 | A  | * | 10/1998 | Helot    | G03B 21/132|
|           |    |   |         |          | 248/917    |
| 5,952,996 | A  |   | 9/1999  | Kim et al. |          |
| 5,999,340 | A  | * | 12/1999 | Goff     | G02B 25/02 |
|           |    |   |         |          | 359/804    |
| 6,181,378 | B1 | * | 1/2001  | Horie    | H04N 1/00204|
|           |    |   |         |          | 348/345    |
| 8,505,470 | B1 |   | 8/2013  | Lira     |            |
| 2007/0207862 | A1 | * | 9/2007 | Calhoun | A63F 13/08 |
|           |    |   |         |          | 463/46     |
| 2007/0292026 | A1 |   | 12/2007 | Reznik et al. |     |
| 2009/0059038 | A1 |   | 3/2009  | Seakins et al. |    |
| 2009/0160977 | A1 |   | 6/2009  | Curtin et al. |     |
| 2010/0053942 | A1 | * | 3/2010 | Tarter   | F21L 2/00  |
|           |    |   |         |          | 362/182    |
| 2010/0193457 | A1 |   | 8/2010  | Rotheisler |         |

(Continued)

*Primary Examiner* — Frederick D Bailey
(74) *Attorney, Agent, or Firm* — GrayRobinson, P.A.; Michael J. Colitz, III (57) ABSTRACT

Disclosed is a magnifier that is adapted to rest upon a table. The magnifier includes an articulated camera arm that permits an associated camera to be pointed in a number of different directions. This permits the camera to focus upon, and enlarge, both distant and nearby objects. The magnifier also includes pivotal support legs. The legs have a first locked position to support the magnifier upon a table and a second position wherein the legs are locked in position adjacent the housing of the magnifier. This permits the magnifier to be readily transportable and stowable to accommodate the needs of the user.

1 Claim, 10 Drawing Sheets

(56) References Cited

U.S. PATENT DOCUMENTS

| | | | |
|---|---|---|---|
| 2011/0074940 A1* | 3/2011 | Goldenberg | ......... G02B 27/026 348/63 |
| 2014/0176690 A1 | 6/2014 | Hamel et al. | |
| 2014/0300715 A1 | 10/2014 | Yoon et al. | |
| 2014/0375783 A1 | 12/2014 | Goldenberg et al. | |

\* cited by examiner

ARTICULATED DESKTOP MAGNIFIER

FIELD OF INVENTION

This invention relates to a desktop electronic magnifier. More particularly, it relates to an articulated desktop electronic magnifier that has a number of different configurations.

BACKGROUND OF THE INVENTION

Low vision refers to an individual's general loss of eyesight. The term includes individuals who may be considered blind but who nonetheless have some remaining eyesight. People with low vision may experience, for example, impaired central vision, peripheral vision, contrast sensitivity, or depth perception. Individuals suffering from low vision struggle with many everyday tasks that sighted individuals take for granted. Such individuals experience great difficulty in reading, writing, watching television, perceiving small objects, or seeing fine detail. Magnifying glasses have long been used by these individuals to enlarge objects or text. Magnifying glasses, however, are of limited use.

Desktop electronic magnifiers, sometimes referred to as closed circuit television devices (cctv), have now largely supplanted magnifying glasses. These devices employ a camera having CMOS technology for generating an enlarged or magnified image of the object. The user is then able to view an enlarged image of the object as it is displayed on an adjacent monitor. Desktop magnifiers are advantageous because they can provide detailed images of objects at very high resolutions. This permits users to select the level of magnification needed to accommodate their individual vision. Also, because desktop magnifiers can be coupled to an external display, users are able to generate very large images of the objects being viewed.

An example of a traditional desktop magnifier is U.S. Pub. 2006/0203093 to Trulaske. Trulaske discloses a closed circuit video magnification system. Notably, Trulaske includes a camera 4 that is mounted over a table by way of an adjustable support. Separate support arms 9 are used to mount an LCD screen.

Magnifiers such as Trulaske, however, are large and bulky and are often designed to permanently reside on a user's desk. Obviously the stationary nature of these magnifiers limits their usefulness. A further limitation is that traditional desktop magnifiers are designed only to magnify objects that are directly below the camera. As a consequence, the only objects that can be magnified are objects that can be placed adjacent the magnifier. Again, this severely limits the usefulness of the magnifier. What is needed, therefore, is a desktop magnifier that is readily transportable and that can enlarge distant images. The video magnifier of the present disclosure is designed to fulfill these and other shortcomings present with existing magnifiers.

SUMMARY OF INVENTION

This disclosure relates to a desktop magnifier.

This disclosed magnifier has several important advantages. One such advantage is realized by providing a magnifier with both a collapsed and a deployed configuration.

A further advantage is realized by providing a magnifier wherein the camera is fully articulated such that the camera can be positioned as needed by the user.

Still yet another advantage is attained by providing a magnifier that while residing upon a desktop can be configured to view either nearby or distant objects.

Yet another advantage is obtained by providing a magnifier with pivotal legs, whereby the legs can support the magnifier upon a desktop and can be folded to attain a collapsed configuration.

It is also advantageous to provide a magnifier wherein the camera arm and housing can be folded together when the magnifier is not in use.

Various embodiments of the invention may have none, some, or all of these advantages. Other technical advantages of the present invention will be readily apparent to one skilled in the art.

BRIEF DESCRIPTION OF THE DRAWINGS

For a fuller understanding of the nature and objects of the invention, reference should be made to the following detailed description, taken in connection with the accompanying drawings, in which.

Similar reference numerals designate similar parts throughout the several views of the drawings.

DETAILED DESCRIPTION OF THE PREFERRED EMBODIMENT

The present disclosure relates to a magnifier that is adapted to rest upon a table when in use. The magnifier is articulated to permit the associated camera to be pointed at objects anywhere around the magnifier. The articulation also permits the camera to focus upon, and enlarge, nearby and distant objects. The magnifier is supported by way of two support legs. The legs can be pivoted between a first position to support the magnifier upon a table and a second position wherein the legs are locked adjacent the magnifier housing. This permits the magnifier to be transportable and stowable to accommodate the needs of the user. The various components of the present invention, and the manner in which they interrelate, are described in greater detail hereinafter.

Figure 1:
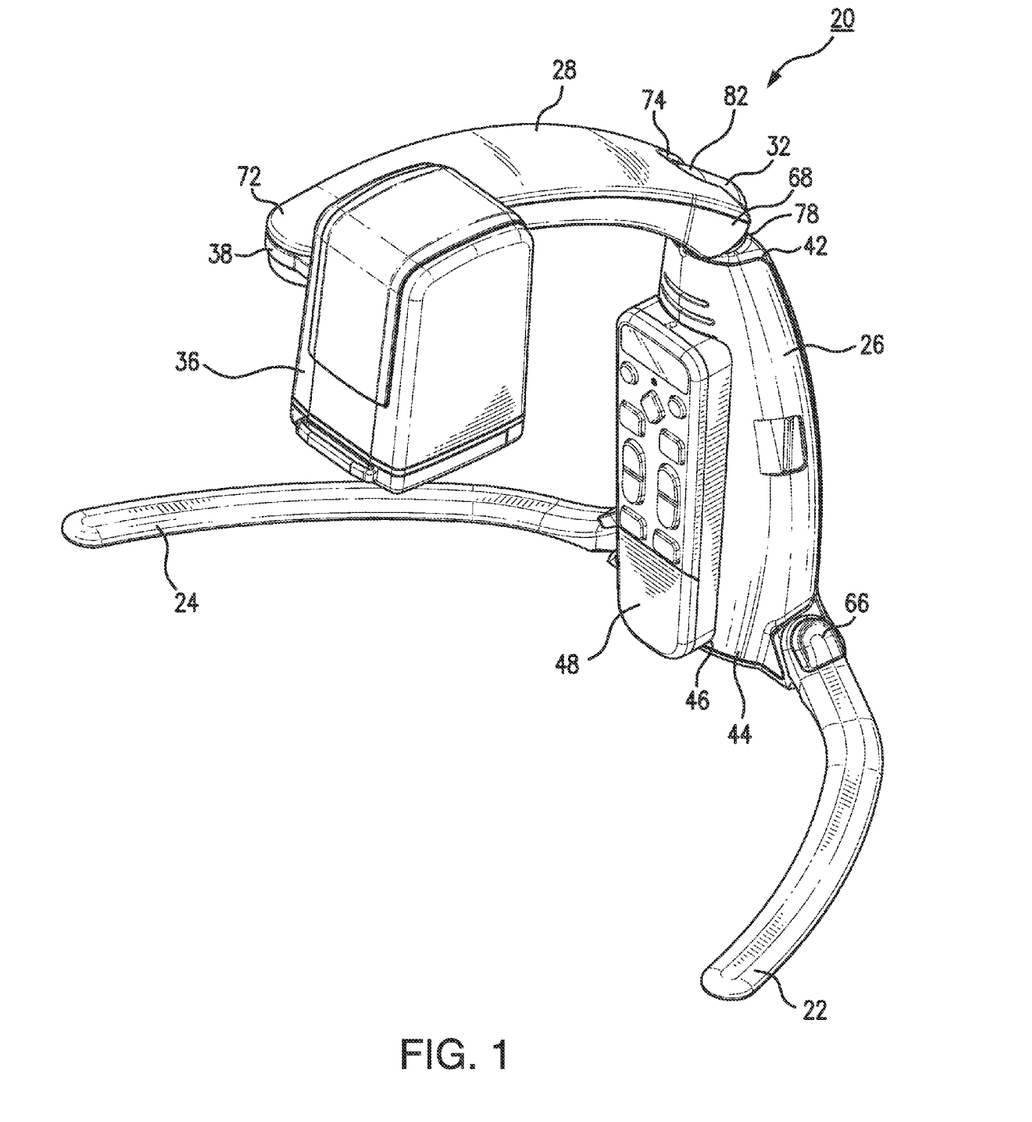
FIG. 1 is a perspective view of the articulated desktop magnifier of the present disclosure.

With reference to FIG. 1, desktop magnifier 20 of the present disclosure is illustrated. Magnifier 20 generally includes first and second support legs (22 and 24, respectively) that are each pivotally connected to a main housing 26. A camera arm 28, in turn, is interconnected to the upper extent of main housing 26 by way of a hinge 32. A camera 34 and camera housing 36 are mounted to a remote end of the camera arm 28 by way of a joint 38 that permits rotation about two axes. The articulated nature of magnifier 20 allows camera 34 to be aimed at a variety of objects and also allows magnifier 20 to be folded into a collapsed configuration.

Figure 4:
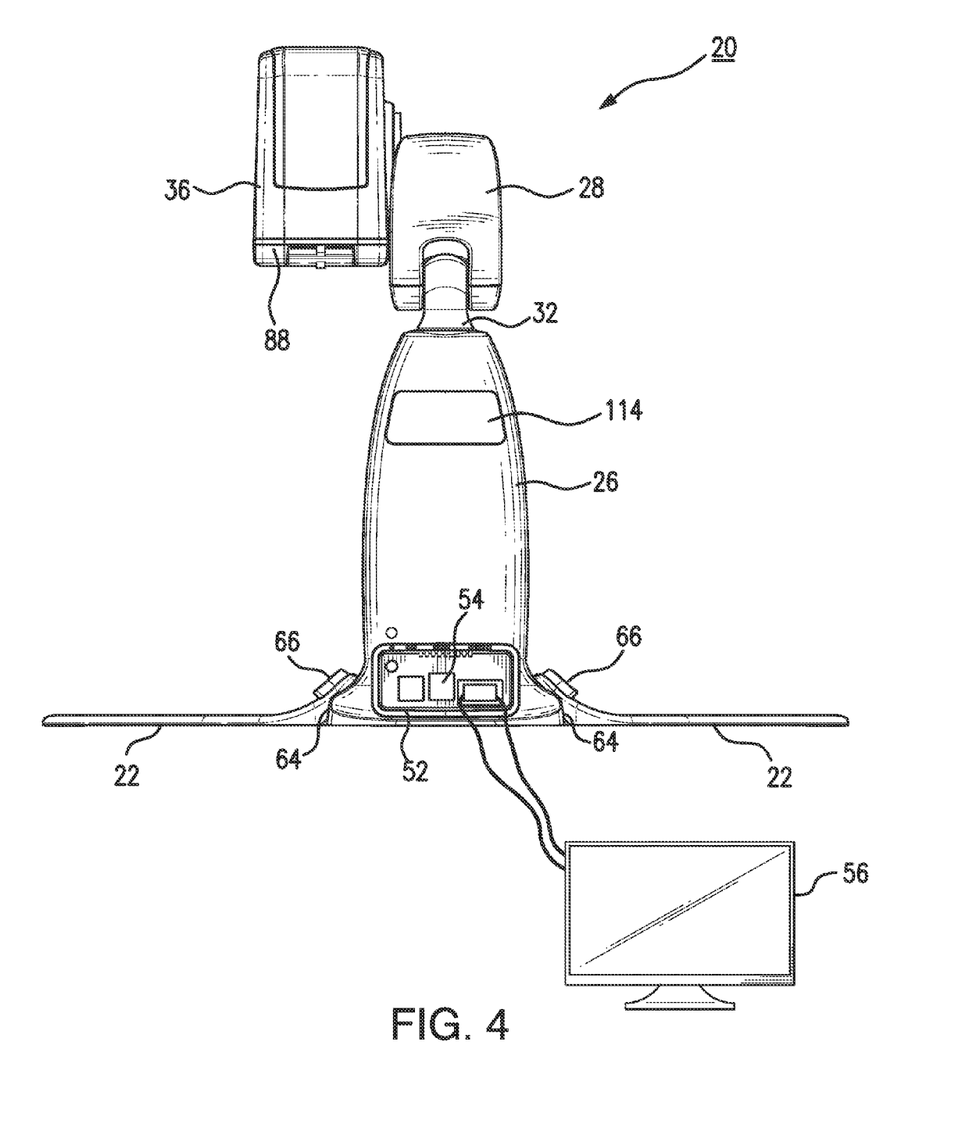
FIG. 4 is a rear elevational view of the articulated desktop magnifier of the present disclosure.
Figure 5:
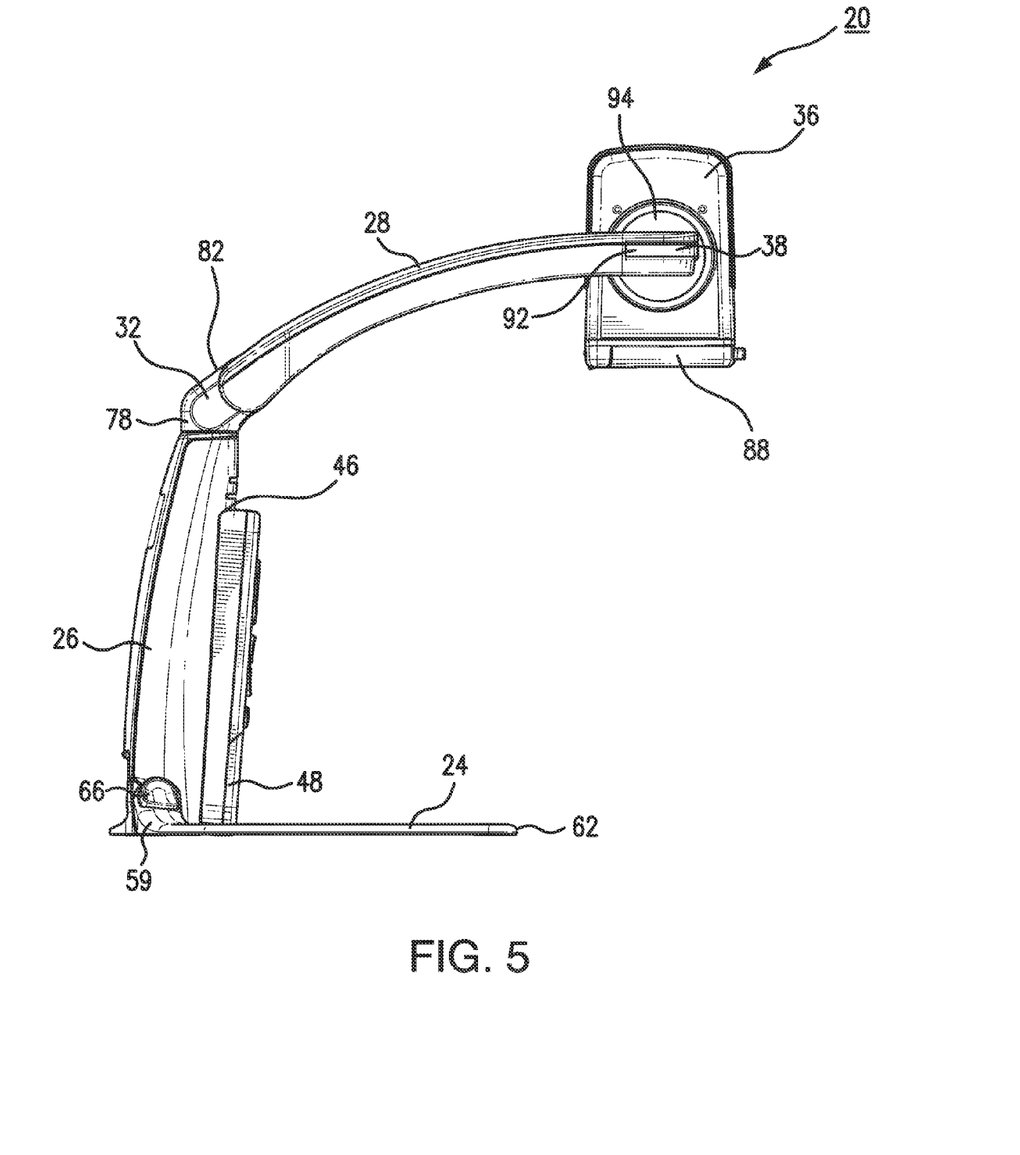
FIG. 5 is a side elevational view of the articulated desktop magnifier of the present disclosure.

With continuing reference to FIG. 1, housing 26 is described. Housing 26 includes upper and lower extents (42 and 44, respectively) and front/back surfaces. A recess 46 is formed within the front surface of housing 26 to accommodate a remote control 48. An access opening 52 (note FIG. 4) within the back surface of housing 26 allows users to access various internal components. Opening 52 also allows access to communications ports 54, such as HDMI, USB, or serial port connectors. These ports 54 allow camera 34 to send video signals to an external display 56 via conventional cables.

Figure 6:
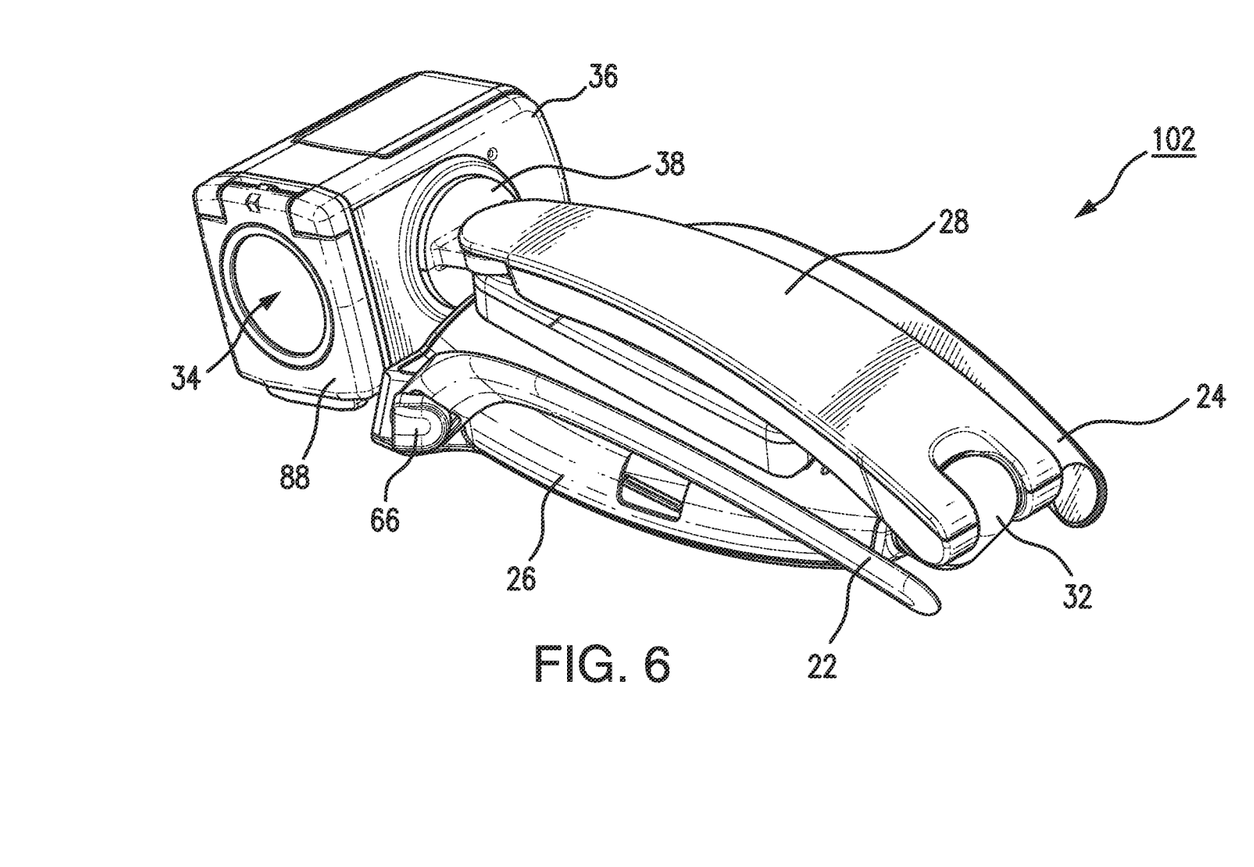
FIG. 6 is a perspective view of the desktop magnifier in the collapsed configuration.
Figure 7:
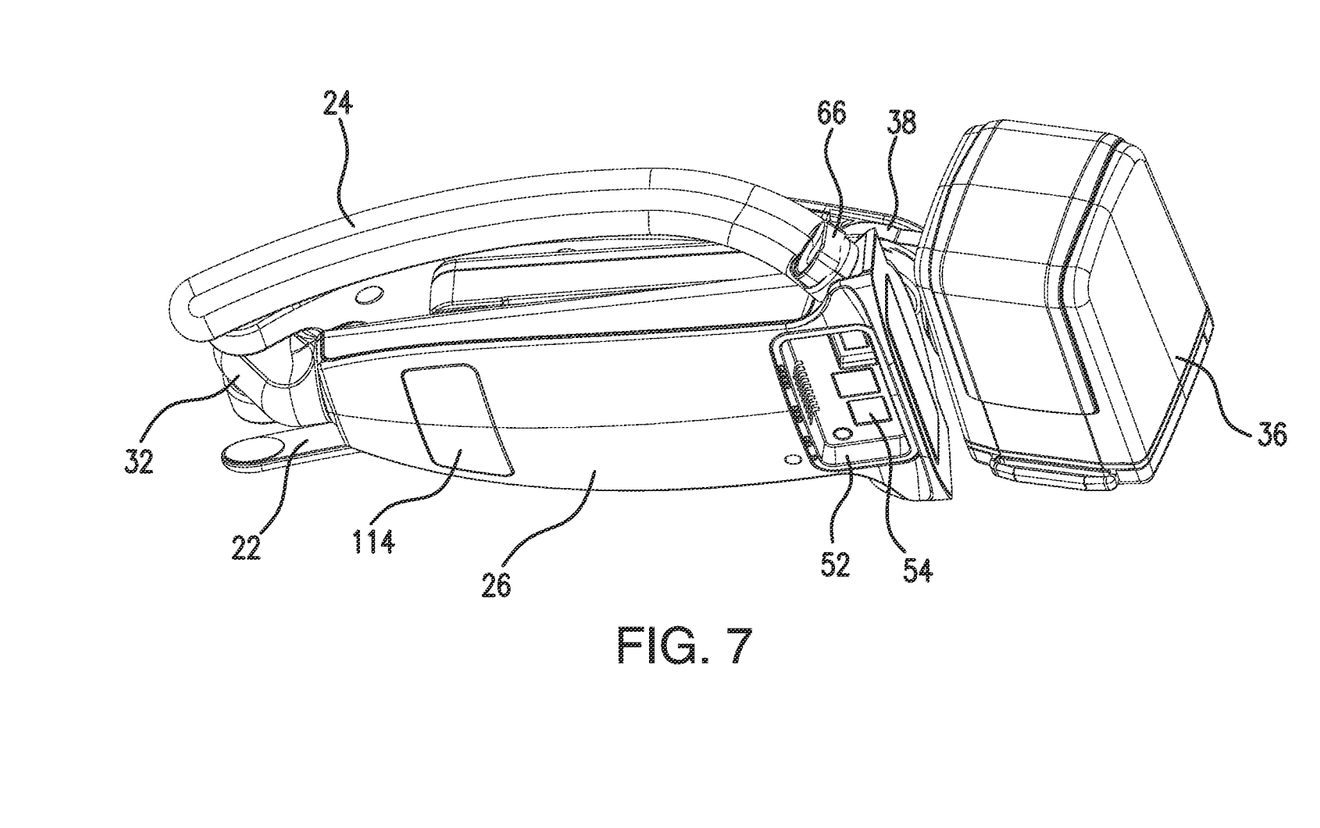
FIG. 7 is a perspective view of the desktop magnifier in the collapsed configuration.

Magnifier 20 is supported by a pair of support legs (22 and 24). More specifically, a first support leg 22 extends outwardly from one side of magnifier 20 and a second leg 24 extends outwardly from the opposite side. Each leg (22 and 24) includes proximal and distal ends (58 and 62) with a curved intermediate extent therebetween. The proximal end 58 of each leg is pivotally interconnected to the lower extent 44 of housing 26 by way of a detent 64. Detent 64 preferably includes two male elements upon the leg (22 or 24) that are cooperatively received within mating female recesses within the lower extent 44 of housing 26. In the preferred embodiment, two sets of female recesses are included that correspond to two distinct positions of the support leg (22 or 24). These positions correspond to the first and second positions of the legs as described below. A lock button 66 is included on each support leg (22 or 24) for selectively engaging and disengaging detent 64. In the preferred embodiment, a spring is included that urges the male elements to engage the female recesses. By depressing lock button 66, the force of the spring can be overcome to disengage the male elements and rotate the support leg (22 or 24) into the second detent position. By way of the detents, the first and second support legs (22 and 24) having a first position wherein the legs (22 and 24) are oriented to support magnifier 20 upon a surface (e.g. FIG. 1) and a second position wherein legs (22 and 24) are pivoted to be substantially aligned with housing 26 (e.g. FIG. 6).

Figure 2:
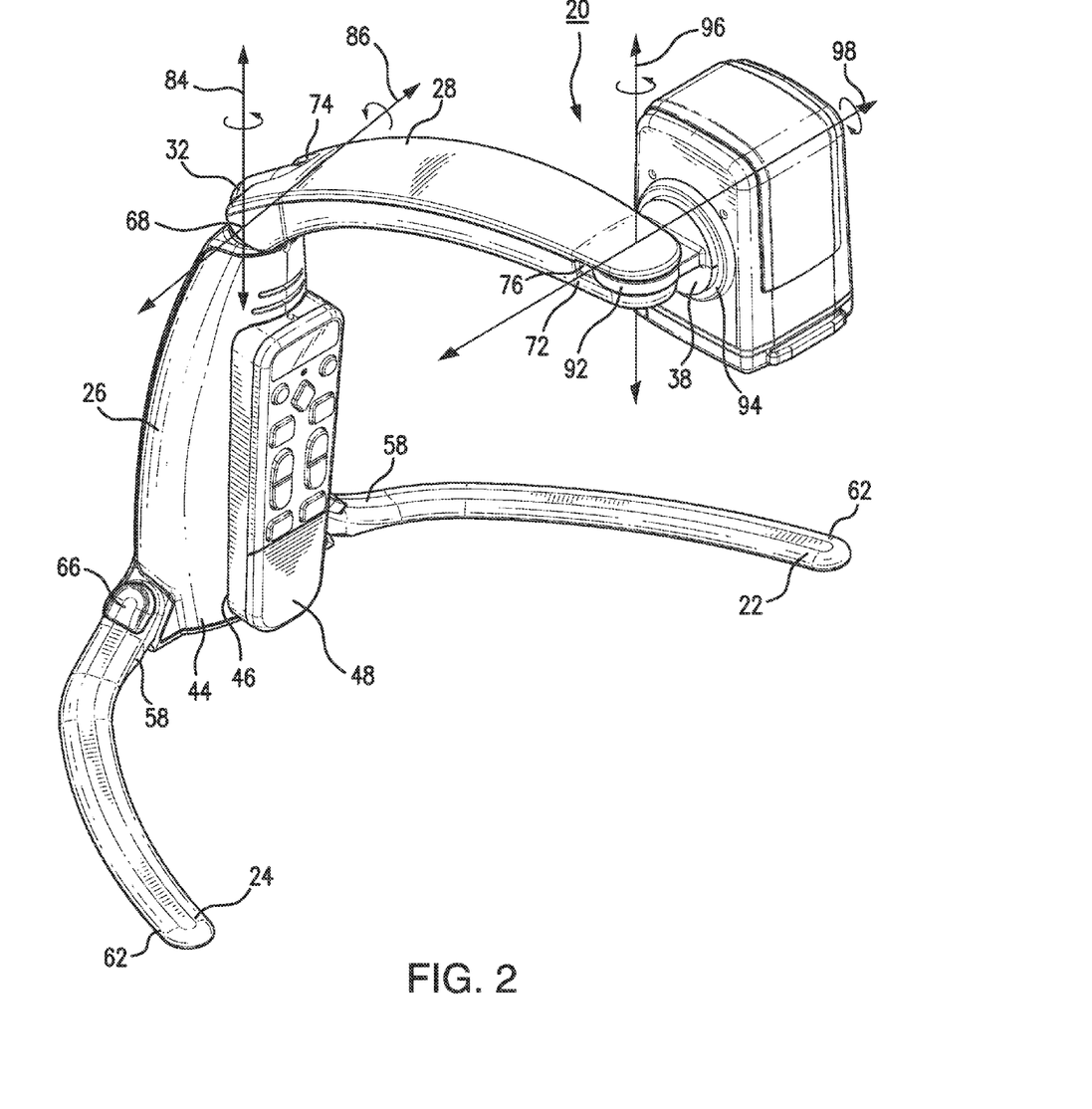
FIG. 2 is a perspective view of the articulated desktop magnifier of the present disclosure showing the various axes of rotation.
Figure 3:
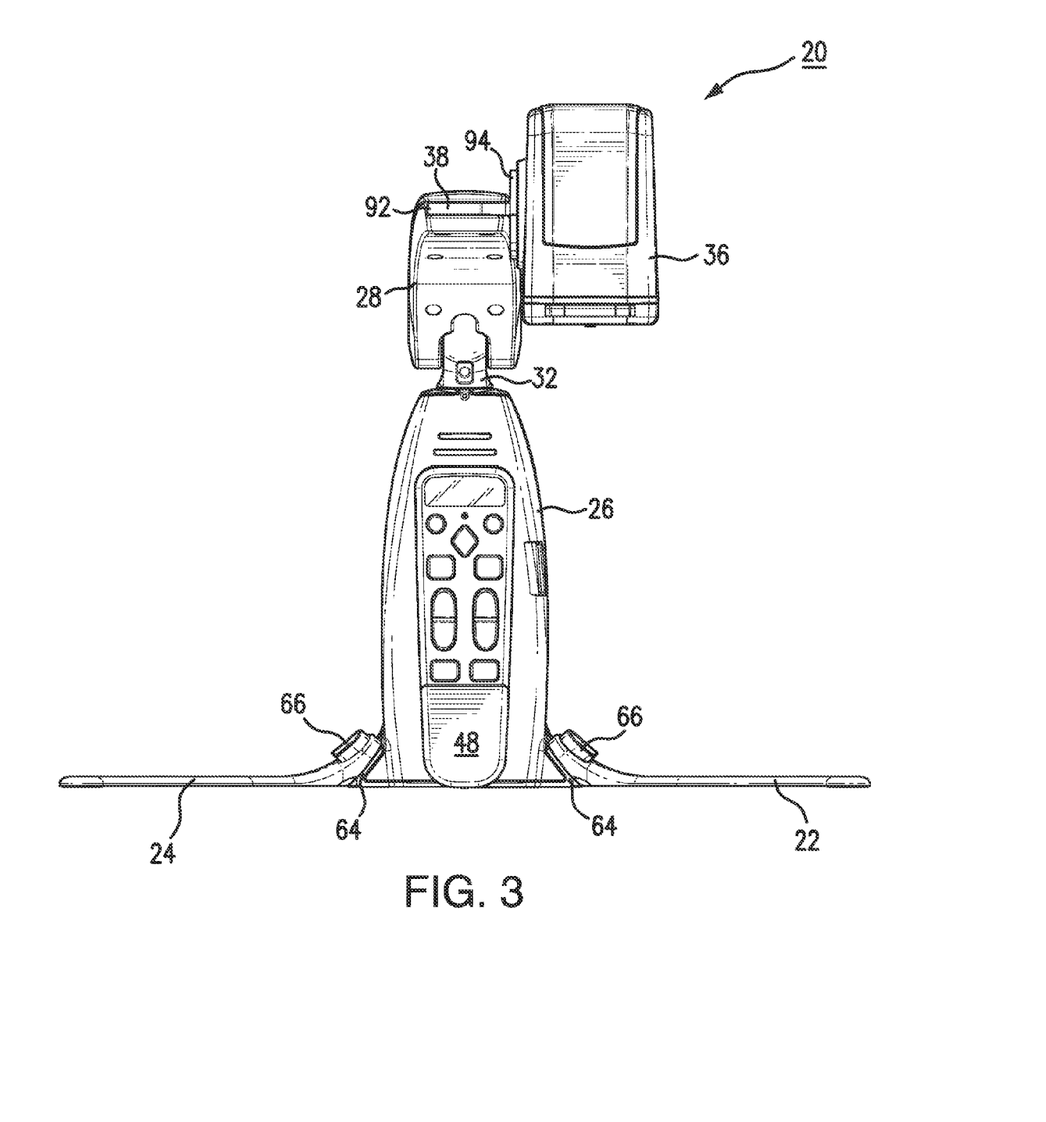
FIG. 3 is a front elevational view of the articulated desktop magnifier of the present disclosure.

Camera arm 28, as illustrated, is preferably curved and is interconnected to housing 26 and camera housing 36. More specifically, the proximal end 68 of camera arm 28 is connected to the upper extent 42 of housing 26. And the distal end 72 of camera arm 28 is connected to camera housing 36. With reference to FIGS. 1 and 2, the proximal end 68 of camera arm 28 includes u-shaped opening 74, or clevis. Distal end 72 of camera arm 28 includes a slotted aperture 76. The function of these features is more fully described hereinafter.

Hinge 32 is used to interconnected housing 26 to camera arm 28. In a preferred but non-limiting embodiment, hinge 32 has a first end 78 that is rotatably interconnected to upper extent 42 of housing 26. Hinge 32 likewise includes a second end 82 that is pivotally coupled to u-shaped open 74 of camera arm 28. As illustrated, the first end of hinge 32 rotates about a substantially vertical axis 84 (note FIG. 2). The second end 82 of hinge 32 connects to the u-shaped opening 74 about a substantially horizontal axis 86 (note FIG. 2). Thus, hinge 32 allows 360° of rotation about its first end 78 and further permits approximately 180° of rotation about its second end 82. This gives the camera arm 28 two degrees of freedom relative to housing 26.

Camera housing 36 can store a conventional high-definition or low-resolution camera 34. Camera 34 can use, for example, a CMOS or CDD image sensor. Camera 34 may have a fixed or a variable focal length. Camera housing 36 may include a pivotally connected lens housing 88. When pivoted into a position in front of camera 34, lens housing 88 permits camera 34 to focus on nearby objects, which are generally objects placed beneath camera 34. Alternatively, when lens housing 88 is pivoted away from the camera aperture, camera 34 can focus on distant objects. Camera 34 can be operated via a remote control 48. As illustrated in FIG. 1, control 48 can be removably stored within recess 46 on the front of housing 26. Remote control 48 can control functions such as turning the camera 34 on/off, selecting the color mode or contrast for display 56, and controlling the magnification of either the camera 34 or display 56. Camera 34 is coupled to external monitor 56 via one of the communications ports 54. It is also possible to allow camera 34 to send images wirelessly to monitor 56 via a WiFi or Bluetooth® connection. A window 114 can be included within housing 26 to permit wireless signals to be received by a controller.

Camera housing 36 is connected to camera 34 arm by way of a pivotal joint 38. Joint 38 includes first and second circular projections (92 and 94, respectively) that are substantially perpendicular to one another. The first circular 92 projection is pivotally received within slot 76 of camera arm 28. The second circular projection 94 is likewise pivotally secured to the side of camera housing 36. Thus, joint 38 permits camera housing 36 to pivot about two substantially perpendicular axes (96 and 98 as noted in FIG. 2). This gives camera housing 36 two additional degrees of freedom with respect to camera arm 28. In total the articulated desktop magnifier 20 includes four different degrees of freedom by providing rotation about four different axes (84, 86, 92, and 94).

Figure 8:
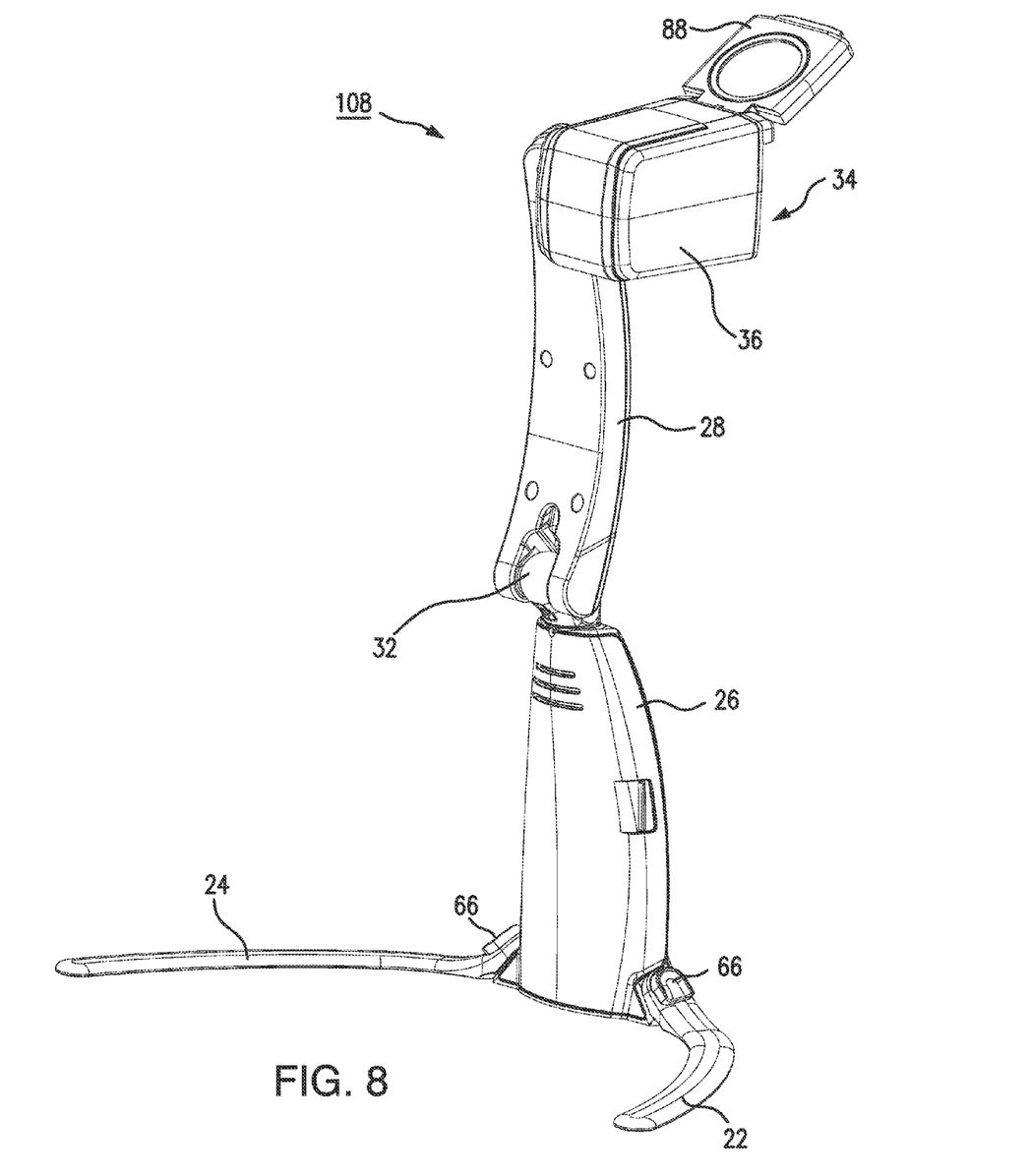
FIG. 8 is a perspective view of the desktop magnifier in the rearward looking configuration.
Figure 9:
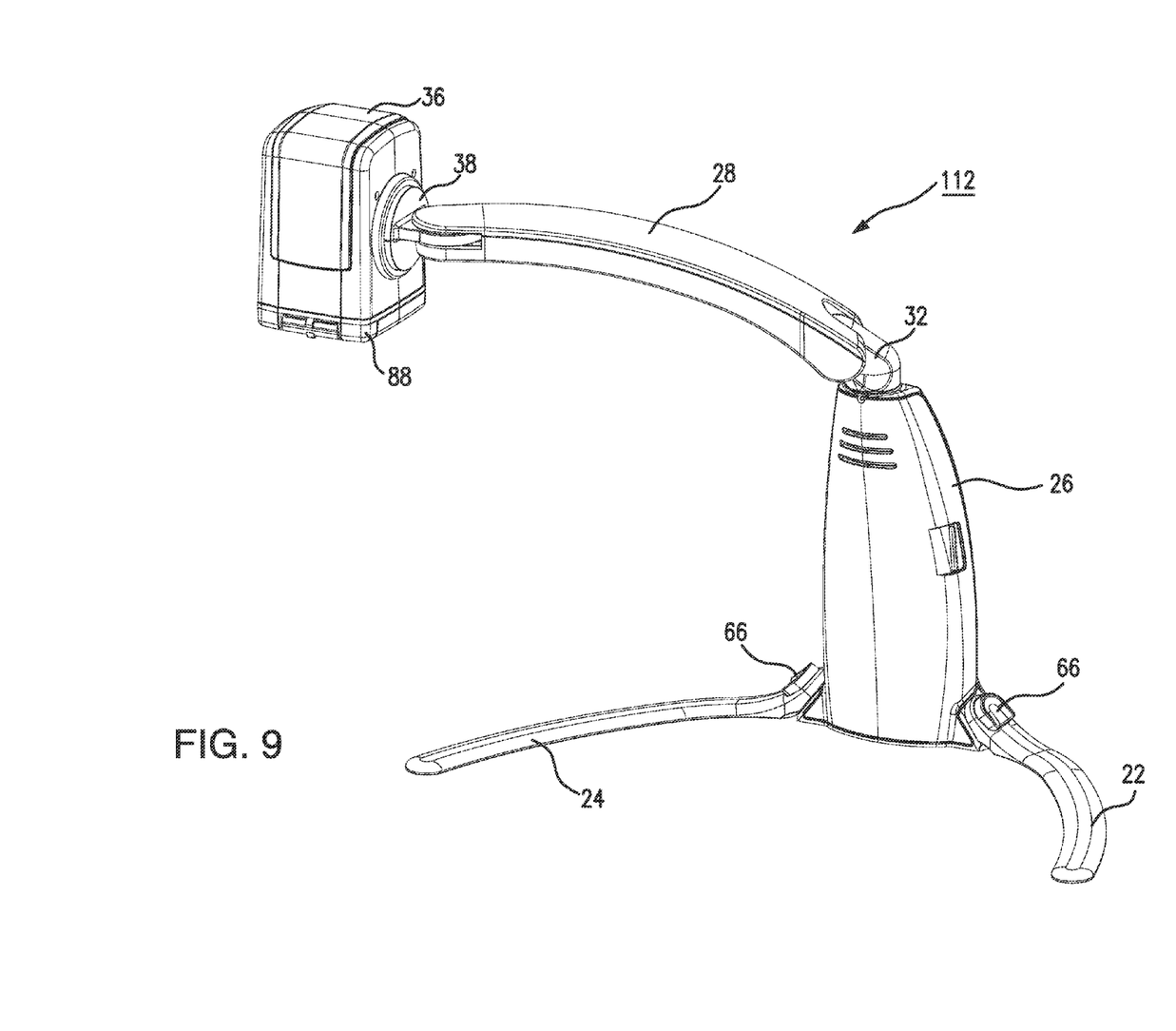
FIG. 9 is a perspective view of the desktop magnifier in the downward looking configuration.
Figure 10:
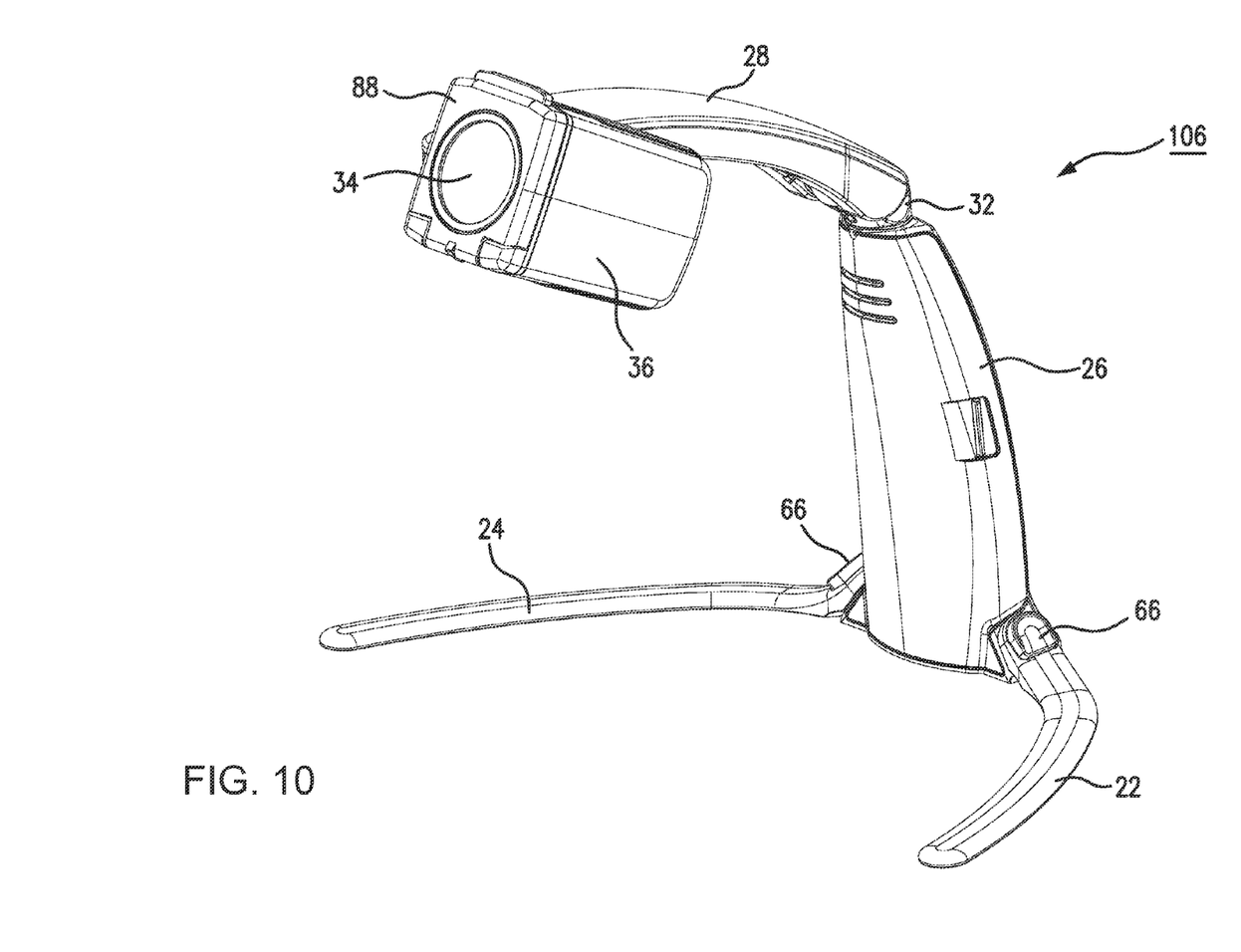
FIG. 10 is a perspective view of the desktop magnifier in the forward looking configuration.

The articulated nature of magnifier 20 allows camera 34 to be pointed in a number of different directions in order to capture images of objects located anywhere around magnifier 20. For example, camera housing 36 can be pivoted in a downward looking configuration (112 of FIG. 9) to capture images of objects positioned on the table near the magnifier 20. In this regard, magnifier 20 can be pivoted about axis 84 to be positioned above nearby objects. Camera housing 36 can be pivoted about axis 98 into a forward looking configuration (106 of FIG. 10). This permits magnifier 20 to focus on distant objects that are not on the table. Pivotal lens housing 88 can be positioned as needed depending upon the distance of the object. Camera arm can also pivot about both axes 84 and 86 in order to bring the camera into a rearward looking configuration (108 of FIG. 8). Here, the lens housing 88 has been removed to allow appropriate focus.

The articulation also allows for both collapsed and deployed configurations. In the deployed configuration (FIG. 2) the first and second support legs (22 and 24) are in the first position and the camera arm 28 and housing 26 are angled with respect to each other. In the collapsed configuration (102 of FIG. 6), legs (22 and 24) are in the second position and the camera arm 28 and housing 26 are pivoted such that the front of the camera arm 28 and the front of the housing 26 are in facing relation to one another. This collapsed configuration 102 is suitable for the transport and storage of magnifier 20.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An articulated desktop magnifier that can be configured into a number of different orientations, the desktop magnifier comprising:

a housing having a lower extent, an upper extent, a front, and a back, a recess within the front, an access opening within the back, a communications port that is accessible via the access opening;

first and second support legs, each leg including proximal and distal ends with a curved intermediate extent therebetween, the proximal end of each leg being pivotally interconnected to the lower extent of the housing by way of a detent, the proximal end of each leg further including a lock button for selectively engaging and disengaging the detent, the first and second support legs having a first position wherein the legs are oriented to support the magnifier upon a surface and a second position wherein the legs are pivoted to be substantially aligned with the housing;

a curved camera arm having proximal and distant ends and front and back surfaces, a u-shaped opening in the proximal end of the camera arm, a slot formed in the distal end of the camera arm;

a hinge interconnecting the housing to the camera arm, the hinge having a first end that is rotatably interconnected to the upper extent of the housing about a substantially vertical axis, the second end of the hinge being pivotally connected within the u-shaped opening about a substantially horizontal axis, whereby the hinge permits the camera arm to both swivel and pivot with respect to the housing;

a camera housing with an internal high definition camera, the camera housing including a pivotal lens cover, the lens cover permitting the focal length of the camera to be selectively adjusted;

a remote control that is removably secured to the recess within the front of the housing, the remote control controlling the operation of the camera;

a joint interconnecting the camera housing to the distal end of the camera arm, the joint including first and second circular projections that are substantially perpendicular to one another, the first circular projection being pivotally received within the slot of the camera arm, the second circular projection being pivotally secured to the camera housing, whereby the joint permits the camera housing to pivot about two substantially perpendicular axes;

whereby the magnifier having both deployed and a collapsed configurations, in the deployed configuration the first and second support legs are in the first position and the camera arm and housing are angled with respect to each other, and in the collapsed configuration the legs are in the second position and the camera arm and housing are pivoted such that the front of the camera arm and the front of the housing are in facing relation to one another.

* * * * *